United States Patent [19]

Instance

[11] Patent Number: 4,850,613

[45] Date of Patent: Jul. 25, 1989

[54] LABEL

[76] Inventor: David J. Instance, Guinea Hall, Sellindge, Kent, United Kingdom

[21] Appl. No.: 225,220

[22] Filed: Jul. 28, 1988

[30] Foreign Application Priority Data

Jul. 30, 1987 [GB] United Kingdom ................ 8718053

[51] Int. Cl.[4] ...................... B42D 19/00; B42D 15/00; B42D 15/04; B32B 23/02

[52] U.S. Cl. .......................................... 281/5; 283/81; 283/62; 428/194

[58] Field of Search ..................... 281/1, 2, 5; 283/61, 283/62, 74, 81; 282/1, 2, 3, 12; 428/121, 181, 194; 604/390, 389, 391; 206/610, 632

[56] References Cited

U.S. PATENT DOCUMENTS

| | | | |
|---|---|---|---|
| 3,920,267 | 11/1975 | Lyon, Jr. | 281/5 |
| 4,524,903 | 6/1985 | Vath | 281/5 |
| 4,538,833 | 9/1985 | Trikilis | 283/62 |
| 4,583,763 | 4/1986 | Shacklett, Jr. | 283/62 |
| 4,590,109 | 5/1986 | Holmberg | 428/194 |
| 4,699,833 | 10/1987 | Instance | 283/81 |

*Primary Examiner*—Frank T. Yost
*Assistant Examiner*—Paul M. Heyrana
*Attorney, Agent, or Firm*—Bernard, Rothwell & Brown

[57] ABSTRACT

A label for attachment to a container, the label comprising a longitudinal strip which is divided into a series of panels by a plurality of transverse fold lines and the panels being divided into respective first and second parts by a longitudinal fold line; the strip being folded about the longitudinal fold line whereby the second part of each panel is superposed over the respective first part and about the transverse fold lines whereby one panel and an adjacent panel respectively constitute rear and front covers of the strip for enveloping the remaining panel or panels of the strip when folded about the longitudinal and transverse fold lines, the transverse edges of the first and second parts of the said one panel being adhered together so that the rear cover panel forms a pocket, the strip including a tear-off portion which is adjacent the rear cover panel and being divided from the rear cover panel by a weakened tear line; and a support web to which the rear face of the rear cover panel is adhered, a first region of the strip being releasably adhered either to the support web or to a second region of the strip thereby to close the label with the front and rear cover panels enveloping the remaining panel or panels, the label being openable by releasing the first part from the second part, and the tear-off portion being separable from the rear cover by tearing along the weakened tear line and being insertable into the pocket of the rear cover panel after use.

7 Claims, 2 Drawing Sheets

LABEL

BACKGROUND OF THE INVENTION

The present invention relates to a label for attachment to a container such as a bottle, packet or tin and in particular to a self-adhesive label which can be carried on a length of release backing material It is an object of the present invention to provide a so-called "extended text" label which can be unfolded to reveal previously hidden surfaces.

SUMMARY OF THE INVENTION

The present invention accordingly provides a label for attachment to a container, the label comprising a longitudinal strip which is divided into a series of panels by a plurality of transverse fold lines and the panels being divided into respective first and second parts by a longitudinal fold line; the strip being folded about the longitudinal fold line whereby the second part of each panel is superposed over the respective first part and about the transverse fold lines whereby one panel and an adjacent panel respectively constitute rear and front covers of the strip for enveloping the remaining panel or panels of the strip when folded about the longitudinal and transverse fold lines, the transverse edges of the first and second parts of the said one panel being adhered together so that the rear cover panel forms a pocket, the strip including a tear-off portion which is adjacent the rear cover panel and being divided from the rear cover panel by a weakened tear line; and a support web to which the rear face of the rear cover panel is adhered, a first region of the strip being releasably adhered either to the support web or to a second region of the strip thereby to close the label with the front and rear cover panels enveloping the remaining panel or panels, the label being openable by releasing the first part from the second part, and the tear-off portion being seperable from the rear cover by tearing along the weakened tear line and being insertable into the pocket of the rear cover panel after use.

Preferably, the front cover panel is adjacent the rear cover panel.

More preferably, the tear-off portion comprises the front cover panel and the weakened tear line extends across the front cover panel.

Still more preferably, the tear-off portion further comprises one of the panels which is adjacent the front cover panel.

The first region may comprise the transverse edge of the said panel which is adjacent the front cover panel.

BRIEF DESCRIPTION OF THE DRAWINGS

An embodiment of the present invention will now be described by way of example only with reference to the accompanying drawings, in which.

DESCRIPTION OF THE PREFERRED EMBODIMENTS

Figure 1:
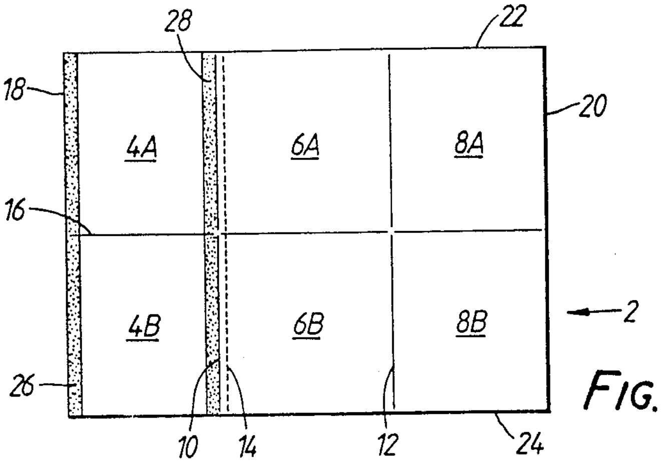
FIG. 1 shows a longitudinal strip for use in a label according to the invention.

Referring to FIG. 1, a longitudinal strip 2 e.g. a paper is divided into a series of panels 4, 6, 8 by a plurality of transverse fold lines 10, 12. A transverse line of perforations 14 is parallel to and spaced from the transverse fold line 10 and extends across the middle panel 6. The panels 4, 6, 8 are each divided into respective first and second parts 4A, 4B; 6A, 6B; 8A, 8B by a longitudinal fold line 16 which extends between the opposed transverse edges 18, 20 of the strip 2. The middle panel 6 is longer in the longitudinal direction than the remaining panels 4, 8. The strip 2 has two longitudinal edges 22, 24 and is rectangular. At the two opposing transverse edges of the first panel 4 are two opposing bands 26, 28 which each extend between the longitudinal edges 22, 24 of the strip 2.

Figure 2:
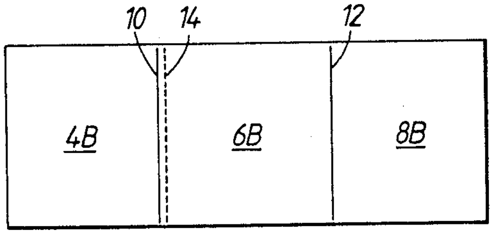
FIG. 2 shows the strip of FIG. 1 when folded about a longitudinal fold line.
Figure 3:
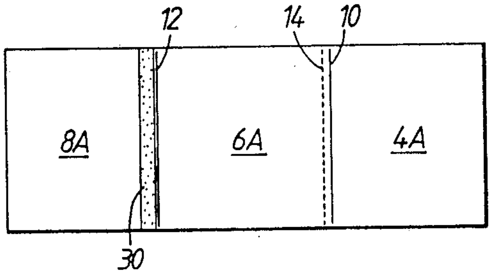
FIG. 3 shows the other side of the folded strip of FIG. 2.

The strip 2 is folded about the longitudinal fold line 16 to the configuration shown in FIG. 2 in which the first and second parts 4A, 6A, 8A and 4B, 6B, 8B of the panels 4, 6, 8 are superposed over each other. The respective superposed parts of each of the bands 26, 28 are adhered together by an adhesive such as a PVA (poly vinyl alcohol) adhesive, thereby to form a pocket between the opposed first and second parts 4A, 4B, of the panel 4. FIG. 2 shows one side of the folded strip 2 which comprises the second parts 4B, 6B, 8B. The other side of the folded strip 2 is shown in FIG. 3 and comprises the first parts 8A, 6A, 4A. The transverse edge of the first part 8A of the panel 8 which is adjacent transverse fold line 12 is provided with a band of resealable adhesive 30, the longitudinal width of which is equal to or less than the difference in longitudinal width between the panel 6 and the remaining panels 4,8.

Figure 4:
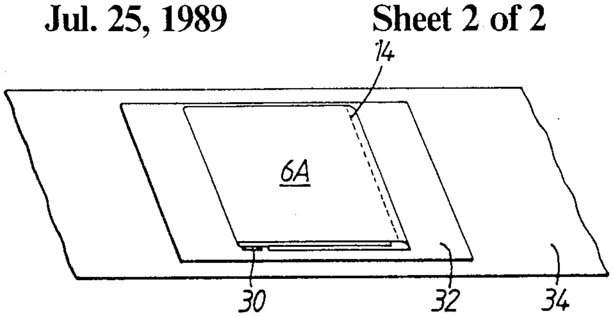
FIG. 4 shows the strip of FIG. 3 when folded further about transverse fold lines and adhered to a support web to form the label of the invention.
Figure 5:
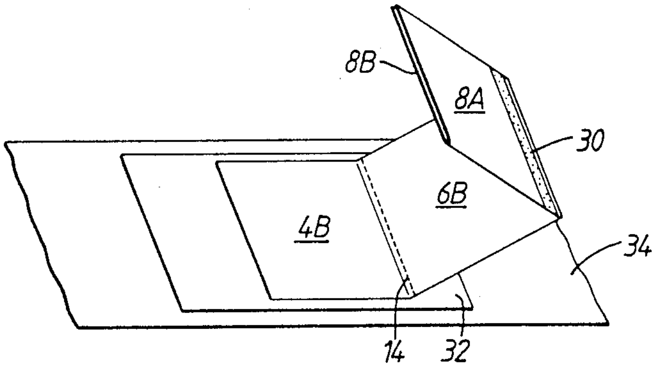
FIG. 5 shows the label of FIG. 4 when opened.

Referring to FIG. 4, in order to make the label of the present invention, the outer face of the first part A—A of the panel 4 is adhered to a support web 32 which is self-adhesive and is carried on a release backing material 34. The panel 4 constitutes a rear cover panel in the label of the present invention. The end panel 8 is folded about transverse fold line 12 so as to dispose the second parts 6B, 8B adjacent each other and then panel 6 is folded about transverse fold line 10 to lie over panel 4 with panel 8 sandwiched therebetween. In this way, panel 6 constitutes a front cover panel and the panel 8 is enveloped between the front and rear cover panels 6, 4. The panel 8 is adhered to the support web 30 by the band of resealable adhesive 30 thereby to hold the label in a closed configuration. In use, the self-adhesive surface of the support web 30 by the band of resealable adhesive 30 thereby to hold the label in a closed configuration. In use, the self-adhesive surface of the support web 32 is adhered to a container. When it is desired to open the label to gain access to the panel 8, as is shown in FIG. 3 a user pulls the band of resealable adhesive 30 away from the support web 32. The panels 6 and 8, which typically include instructions relating to the product in the container, may then be torn away from the rear cover 4 by tearing along the line of perforations 14. In this way, panels 6 and 8 constitute a tear-off portion. The panels 4 and 8 can then be unfolded and read by a user.

Figure 6:
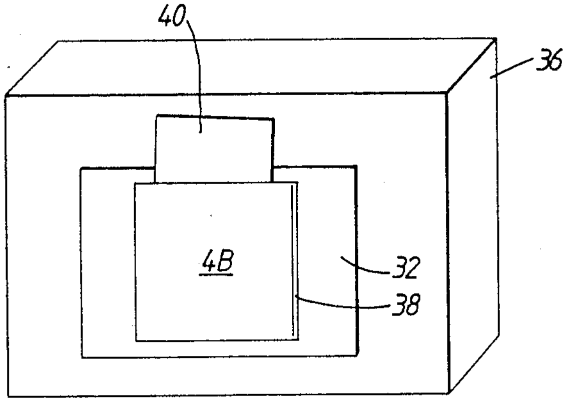
FIG. 6 shows the label of FIG. 5 after a tear-off portion has been torn-off and inserted into a packet, the label also being adhered to a container.

Referring now to FIG. 6, when the user has read the tear-off portion, it can be refolded and inserted into the pocket which is formed by the adhered together first and second parts of the rear cover panel 4. In this way, the tear-off portion can be safely and securely kept in the label for subsequent use and protected from damage by being held within the pocket. FIG. 6 shows the label being adhered to a container 36. The remaining part 38 of the panel 6 after the tear-off portion 40 has been torn away is still attached to the rear cover panel 4.

In an alternative arrangement, there may be further panels of the strip 2 which are connected to the panel 8 and are removed together with the panels 6 and 8 when the line of perforations 14 is torn in the manner described above. The number and dimensions of the panels may be chosen to suit the desired requirements. Furthermore, the line of perforations need not be provided adjacent the transverse fold line 10 between the rear and front panels 4, 6 but may be located in any other convenient position thereby to vary the shape and size of the tear-off portion 40.

In a further alternative arrangement, additional panels may be attached to the rear cover panel 4 on the other transverse edge of the rear cover panel 4 from that to which the front cover panel 6 is attached. These additional panels are folded to lie over the rear cover panel 4 and are covered by the front cover panel 6.

In addition, the panels 6 and 8 can be dimensioned so that the band of resealable adhesive 30 is adhered to the rear cover panel 4 (or, when there are further panels, to one of those further panels) rather than to the support web 32.

In a still further alternative arrangement the panel 8 is releasably adhered in its closed configuration by a band of hydrophobic material, which is provided on the transverse edge of panels 8 instead of the band of resealable adhesive 30, and a corresponding band of resealable adhesive (i.e. a water-soluble adhesive such as PVA (poly vinly alcohol) which is provided on the support web 32 adjacent the transverse end edge 18 of the rear cover panel 4. The hydrophobic material may be a mixture of a polysiloxane and a varnish such as that disclosed in my British Patent Specification No. 2,141,994 published Jan. 9, 1985. The hydrophobic materials contains from 90 to 99.5 vol % polysiloxane and from 0.5 to 10 vol % varnish, such as an overprinting varnish.

The present invention provides a label which is inexpensive and convenient to manufacture and is convenient in use. A succession of the self-adhesive labels of the invention may be provided on a length of release backing material from which they may be successively applied to containers or products to be labelled by an automatic labelling machine.

The labels of the present invention may be made by either of the methods which are disclosed in British Patent Specification No. 2,127,378 published on Apr. 11, 1984 in the name of David J. Instance.

In those methods, a length of pressure-sensitive stock, consisting of an elongate web of self-adhesive paper which is carried on a backing of release material 34 is passed, in turn, through a die-cutting station at which a succession of support webs 32 are cut in the elongate web and through an adhesive applying station at which a succesion of layers of adhesive are applied to the succession of support webs 32. The part of the elongate web which is outside the support webs 32 is removed as a waste web remnant either before or after the adjesive applying station. The succession of support webs 32 on the release backing material 34 then passes through a label applying station at which a succession of the folded longitudinal strips 2, having the band of resealable adhesive of hydrophobic material already provided thereon, are applied to the succession of support webs 32 so that each folded longitudinal strip 2 is adhered to a respective support web 32 by a respective layer of adhesive. The resultant labels on the release backing material 32 are wound up onto a reel from which they may subsequently be removed for application to containers.

What I claim is:

1. A label for attachment to a container, the label comprising a longitudinal strip which is divided into at least three panels by a plurality of transverse fold lines and the panels being divided into respective first and second parts by a longitudinal fold line; the strip being folded about the longitudinal fold line whereby the second part of each panel is superposed over the respective first part and about the transverse fold lines whereby one panel and an adjacent panel respectively constitute rear and front covers of the strip for enveloping the remaining panel or panels of the strip when folded about the longitudinal and transvese fold lines, the transverse edges of the first and second parts of the said one panel being adhered together so that the rear cover panel forms a pocket, the strip including a tear-off portion which is adjacent the rear cover panel and being divided from the rear cover panel by a weakened tear line; and a support web to which the rear face of the rear cover panel is adhered, means for releasably adhering a first region of the strip either to the support web or to a second region of the strip thereby to close the label with the front and rear cover panels enveloping the remaining panel or panels, the label being openable by releasing the first region from the support web or the second region, and the tear-off portion being separable from the rear cover by tearing along the weakened tear line and being insertable into the pocket of the rear cover panel after use.

2. A label according to claim 1 wherein the tear-off portion comprises the front cover panel, and wherein the weakened tear line is located on the front cover panel.

3. A label according to claim 2 wherein the tear-off portion further comprises one of the panels which is adjacent the front cover panel.

4. A label according to claim 3 wherein the said first region comprises the transverse edge of the said panel which is adjacent the front cover panel.

5. A label according to claim 1 wherein the longitudinal strip is rectangular.

6. A label according to claim 1 wherein the rear face of the support web is self-adhesive.

7. A length of release backing material carrying thereon a succession of labels as claimed in claim 6.

* * * * *